J. F. COLLINS.
TIRE PROTECTOR.
APPLICATION FILED NOV. 30, 1910.
995,119.
Patented June 13, 1911.
2 SHEETS—SHEET 1.
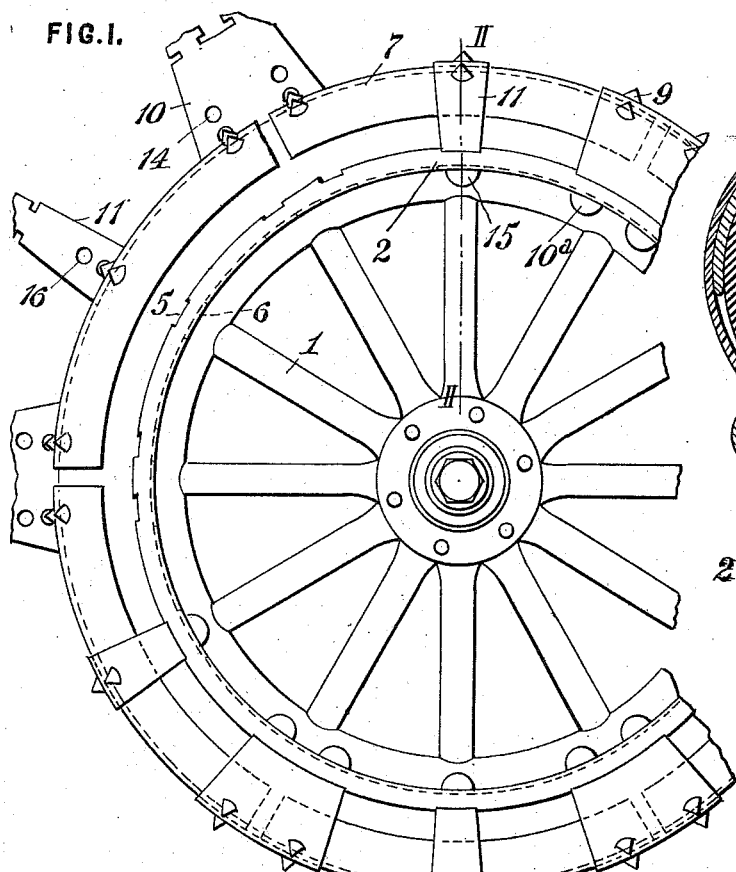
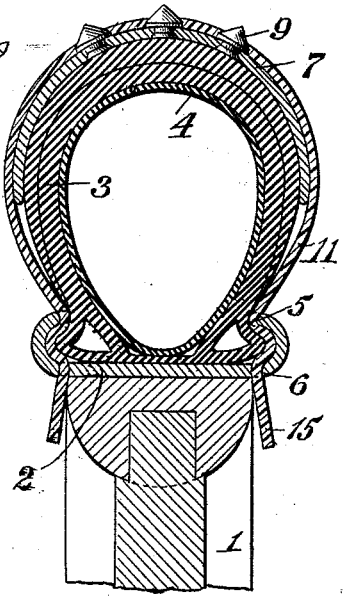
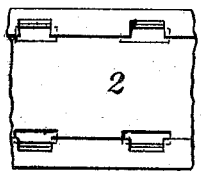
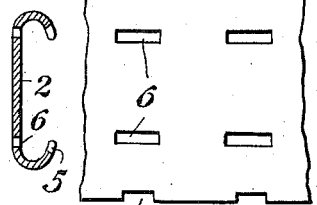
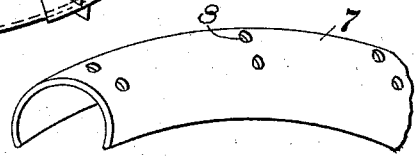
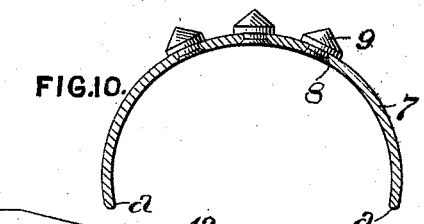
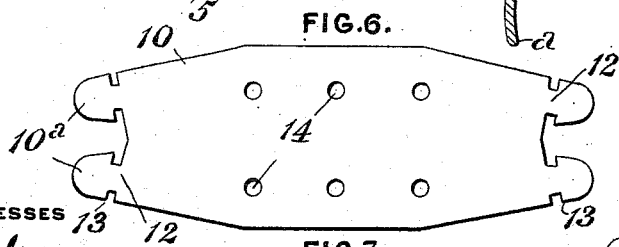
WITNESSES
H. E. Gaither
Ella McConnell
INVENTOR
James F. Collins
by W. G. Doolittle
Attorney J. F. COLLINS.
TIRE PROTECTOR.
APPLICATION FILED NOV. 30, 1910.
995,119.
Patented June 13, 1911.
2 SHEETS—SHEET 2.
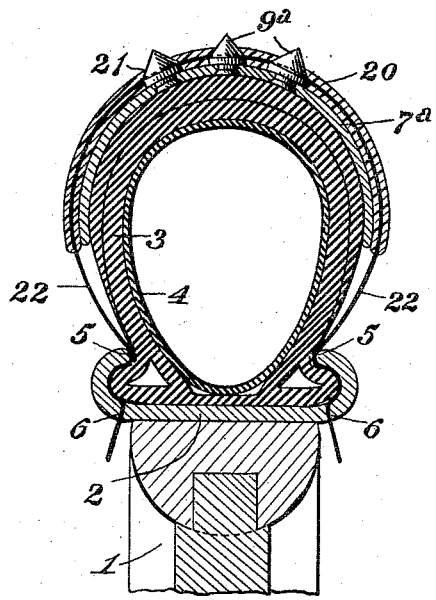
FIG. 11.
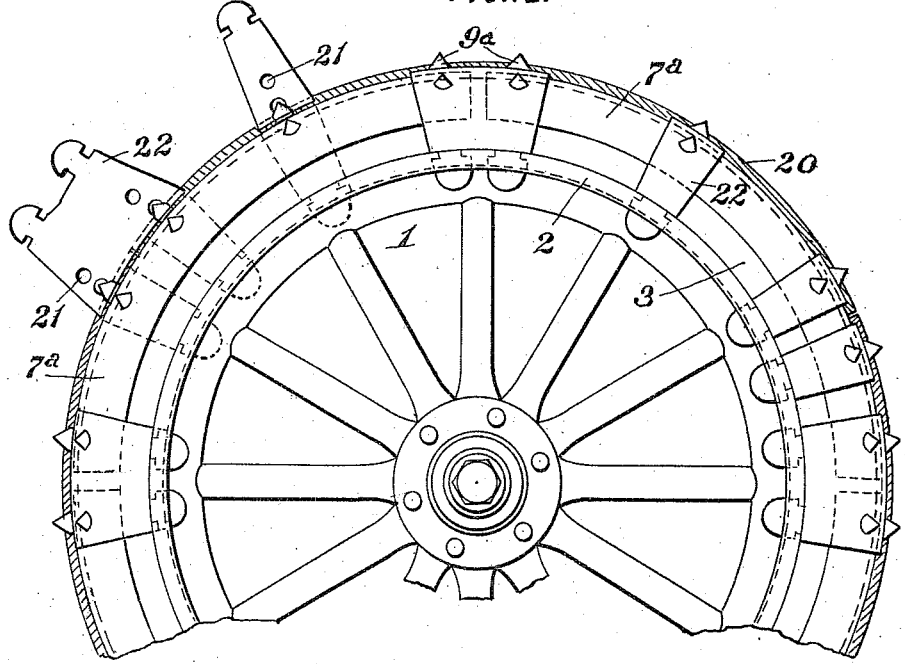
FIG. 12.
FIG. 13.
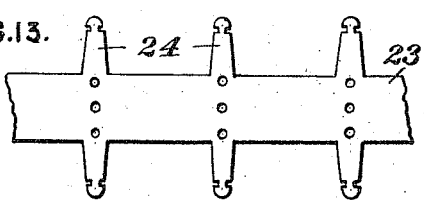
WITNESSES
J. E. Gaither.
Ella McConnell
INVENTOR
James F. Collins
by W. G. Doolittle
Attorney

UNITED STATES PATENT OFFICE.

JAMES F. COLLINS, OF WILMERDING, PENNSYLVANIA.

TIRE-PROTECTOR.

995,119.

Specification of Letters Patent. Patented June 13, 1911.

Application filed November 30, 1910. Serial No. 594,856.

*To all whom it may concern:*

Be it known that I, JAMES F. COLLINS, a resident of Wilmerding, in the county of Allegheny and State of Pennsylvania, have invented certain new and useful Improvements in Tire-Protectors, of which the following is a specification.

The prime object of my invention is to provide new and improved means for protecting pneumatic tires of automobile and other vehicle wheels.

A further object of the present invention is to provide a tire protector for tires of the class mentioned that will not affect the resiliency of the tire, and at the same time provide a simple and efficient means for protecting the tire.

In the accompanying drawings, which illustrate applications of my invention, Figure 1 is a side elevational view of a portion of an automobile wheel embodying my invention; Fig. 2, an enlarged vertical sectional view, the section being taken on line II—II of Fig. 1; Figs. 3, 4 and 5 detail views of the wheel-rim, Fig. 3 being a plan showing the rim rolled into operative position, Fig. 4 a sectional view, and Fig. 5 a plan of the blank from which the rim is formed; Fig. 6, a plan view of an interlocking securing member or strap; Fig. 7, a side elevational view of same; Fig. 8, a plan view of a supplementary securing member or strap; Fig. 9, a perspective view of a section of a tread-member; Fig. 10, a cross-sectional view particularly showing anti-skidding means in connection with the tread-member; Fig. 11, an enlarged sectional view showing a modified form of my invention; Fig. 12, a part sectional view and a part elevational view showing an application of the form of Fig. 11; and Fig. 13, a plan of a still further modified form of tread-member showing the securing means made integral therewith.

Referring to the drawings and first to the form of Fig. 1, 1 designates the wheel, and 2 the rim thereof. The outer tube 3 of the pneumatic tire of well known construction is mounted on the rim 2 and secured thereto in the usual manner.

4 designates the inner tube of the pneumatic tire.

As illustrated and as preferred, the rim is provided with two series of edge notches 5, and with two series of slots or openings 6. It will be noted that the notches 5 of each series, when the rim is bent into operative position as shown by Fig. 3, will assume positions over the openings 6 of the respective series of openings formed in the rim.

Circumferentially disposed on the outer tube 3 is a sectional member or a plurality of members 7. These members 7 are preferably made of thin sheet metal, and in the construction illustrated, I have shown six members of the form of an inverted U in cross-section with their inner edges rounded, as shown at *a*, and each formed with openings 8 adapted to receive anti-skidding members 9. In this form of my invention the members 7 constitute portions of the tread of the wheel or the tread of the protector. The members constituting the tread-portions may be varied from the number shown, but a sufficient number should be employed in order not to affect the resiliency of the tire, and the adjacent meeting ends of said members are preferably spaced apart as shown. The series of members constituting the tread-member are securely connectd with the rim of the wheel by suitable detachable securing means and, as illustrated, these means comprise members 10 and 11, respectively designed to encircle the tire and tread-member and engage or interlock with the rim. Securing members 10 are disposed at the ends of the several members 7, and members 11 are located between and alternate with members 10. Members 10 are preferably formed of leather although they may be formed of other suitable material and are each provided with means for engaging the rim of the wheel. As shown, I form at each end two spaced tongues $10^a$ each having a portion 12 designed to enter a notch 5 of the rim, and each having shoulders 13 to engage the rolled unnotched portion of the rim. The outer ends of the tongues project through the openings 6 of the rim. This construction provides a simple and efficient interlocking means for locking the securing members to the rim. Members 10 are also provided with holes 14 through which the members 9 of the tread-member project.

The members 11 are designed to be locked to the rim of the wheel in substantially the same manner as members 10, members 11 however have only a single tongue 15 at each end, but are provided with openings 16 to receive members 9 and with a portion $12^a$ and shoulders $13^a$ corresponding with the portion 12 and the shoulders 13 of the members 10. The protector is applied to the tire before the latter is inflated, and it will be readily seen that when the parts are properly assembled with the locking members 10 and 11 in coacting relation with rim, an inflation of the tire will cause the protector to be firmly held in position on the tire.

In the modified form of my invention illustrated by Figs. 11 and 12, the wheel-rim and the tire are the same as in the form of Fig. 1. In this latter construction however, I show fewer members 7ª, corresponding with the members 7, than in the form of Fig. 1, and these members 7ª are covered by members or pieces 20 which latter constitute the tread-members of the protector. In this form of my invention the members 7ª are provided with projecting members 9ª and in order to receive said members 9ª members 20 are formed with openings 21. For securing the protector to the wheel-rim I provide a series of securing members 22 preferably made of thin steel and of substantially the same form as the securing members 10 and 11 of the form of Fig. 1. These members are passed through members 20, which latter are preferably made of leather, and are designed to interlock with the wheel-rim in the same manner as in the form of Fig. 1.

Fig. 13 shows a still further modification of my invention, in this instance, the tread-member 23 of the protector is made of leather and designed to cover the steel plates as in the form of Fig. 11, but the securing means 24 are made integral with said members 23.

What I claim is:—

1. The combination with a wheel rim having an inturned upper edge formed with a notch, of a tire mounted on the rim, a tire protector comprising a plurality of circumferentially disposed spaced members, anti-skidding projections on said members, and means for securing the spaced members to the wheel rim comprising a band having an opening therein to receive an anti-skidding projection and a tongue formed on one end thereof, said tongue entered in the notch of the inturned edge and engaging the edge adjacent to the notch.

2. The combination with a wheel rim having inturned upper edges each having a series of notches formed therein and said rim provided with a series of openings disposed below the notches and in line therewith, of a pneumatic tire mounted on the rim, a tire protector comprising a plurality of circumferentially disposed spaced members, anti-skidding projections on said members, and means for securing the spaced members to the wheel rim comprising a band formed with openings to receive the anti-skidding projections and having a tongue formed on each end thereof, said tongues entered in the notches of the inturned portions and engaging the same adjacent to the notches and projecting through the registering openings of the wheel rim.

3. The combination with a wheel rim having inturned edges each provided with a series of notches, said wheel rim having a series of openings registering with said notches, a tire mounted on the rim, a plurality of spaced members circumferentially disposed on the tire, each provided with an anti-skidding projection, and a series of tread-members mounted on the first mentioned members, a securing band extending through each of the latter members and having a tongue at each end thereof, said tongues entered in the notches and extending through the openings of the rim.

In testimony whereof I affix my signature in presence of two witnesses.

JAMES F. COLLINS.

Witnesses:
W. G. DOOLITTLE,
F. E. GAITHER.

---

Copies of this patent may be obtained for five cents each, by addressing the "Commissioner of Patents, Washington, D. C."